(12) United States Patent
Meulenbrugge et al.

(10) Patent No.: US 7,834,110 B2
(45) Date of Patent: Nov. 16, 2010

(54) ADDITION OF ORGANIC INITIATORS DURING THE PRESSURE DROP IN VINYL CHLORIDE MONOMER POLYMERIZATION REACTIONS

(75) Inventors: Lambertus Meulenbrugge, Westervoort (NL); Koen Antoon Kornelis Vanduffel, Deventer (NL); Hans Westmijze, Bathmen (NL)

(73) Assignee: Akzo Nobel N. V., Arnhem (NL)

( * ) Notice: Subject to any disclaimer, the term of this patent is extended or adjusted under 35 U.S.C. 154(b) by 0 days.

(21) Appl. No.: 12/044,768

(22) Filed: Mar. 7, 2008

(65) Prior Publication Data

US 2008/0221266 A1 Sep. 11, 2008

Related U.S. Application Data

(63) Continuation of application No. 10/497,993, filed on Jul. 28, 2004, now abandoned.

(51) Int. Cl.
*C08F 2/00* (2006.01)
*C08F 4/38* (2006.01)
*C08F 4/28* (2006.01)
*C08F 114/06* (2006.01)

(52) U.S. Cl. ............................ 526/79; 526/81; 526/228; 526/344.2; 526/227

(58) Field of Classification Search ................ 526/79, 526/81, 228, 344.2, 227
See application file for complete search history.

(56) References Cited

U.S. PATENT DOCUMENTS

| | | | |
|---|---|---|---|
| 3,325,453 | A | 6/1967 | Lim et al. |
| 3,451,985 | A | 6/1969 | Mahlo |
| 3,954,698 | A | 5/1976 | Bradley et al. |
| 4,015,065 | A | 3/1977 | Park et al. |
| 4,193,890 | A | 3/1980 | Sidi |
| 5,739,222 | A | 4/1998 | Kobayashi et al. |
| 5,908,905 | A | 6/1999 | Nakano et al. |
| 6,384,155 | B1 * | 5/2002 | Van Swieten et al. ......... 526/79 |
| 2005/0054795 | A1 | 3/2005 | Westmijze et al. |

FOREIGN PATENT DOCUMENTS

| | | | |
|---|---|---|---|
| CA | 984548 | | 2/1976 |
| DE | 247 805 | | 7/1987 |
| EP | 1 375 529 | | 1/2004 |
| EP | 1 495 057 | | 1/2005 |
| GB | 1 334 489 | | 10/1973 |
| JP | 1-172407 | | 7/1989 |
| JP | 04-011606 | | 1/1992 |
| JP | 7-082304 | | 3/1995 |
| JP | 11-106408 | | 4/1999 |
| RU | 2 178 799 | | 5/2007 |
| WO | WO 00/17245 | * | 3/2000 |

OTHER PUBLICATIONS

Opposition of European Patent Application No. EP 1456257, communicated on Mar. 23, 2010 (English-language translation provided).
Opposition of European Patent Application No. EP 1456257, communicated on Mar. 31, 2010 (English-translation provided).
U.S. Appl. No. 60/342,434, filed on Dec. 21, 2001.
European Patent Application No. 02077471.7, filed on Jun. 18, 2002.
*Encyclopedia of PVC*, 1976, pp. 76-85.
*Polymer Handbook*, 1989, pp. II/1-2 and 57-65.
ISO 182-2 (1990E); International Standard; "Plastics-Determination of the tendency of compounds and products based on vinyl chloride homopolymers and copolymers to evolve hydrogen chloride and any other acidic products at elevated temperatures;" pp. 1-11.
Ullmanns Encyclopedia of Industrial Chemistry "4.1 Suspension Polymerization of Vinyl Chloride.".

* cited by examiner

*Primary Examiner*—William K Cheung
(74) *Attorney, Agent, or Firm*—Kenyon & Kenyon LLP

(57) ABSTRACT

The invention pertains to a process to polymerize one or more monomers wherein one or more initiators and optionally one or more surfactants are added to a polymerization mixture when the pressure in the polymerization reactor is dropping. This process allows a shorter polymerization time due to a higher pressure drop rate at the end of the polymerization reaction. Moreover, the cooling capacity of the polymerization reactor is used more efficiently.

18 Claims, No Drawings

ADDITION OF ORGANIC INITIATORS DURING THE PRESSURE DROP IN VINYL CHLORIDE MONOMER POLYMERIZATION REACTIONS

CROSS-REFERENCE TO RELATED APPLICATION

This application is a continuation of U.S. patent application Ser. No. 10/497,993 filed on Jul. 28, 2004, which is U.S. National Phase of PCT/EP2002/14371 filed on Dec. 17, 2002, which claims priority to U.S. Provisional Application 60/342,434 filed on Dec. 21, 2001 and European Application 02077471.7 filed on Jun. 18, 2002, all of which are incorporated herein by reference in their entirety.

The present invention relates to a process wherein one or more initiators are used to polymerize a mixture containing one or more monomers of which one is vinyl chloride monomer (VCM).

As is known to a person skilled in the art, such a process can be performed in many different ways. It is generally desired to shorten the total polymerization time. This can be achieved by shortening the period of constant pressure in the polymerization reactor, or by reducing the time required to complete the polymerization reaction after the pressure in the reactor starts to drop. An example of a process where the time of pressure drop is reduced is U.S. Pat. No. 5,908,905, wherein a process is described which is completed at a higher temperature than a preset temperature for the polymerization. However, such a temperature increase may result in discolouration of the polymer. Above all, it has the disadvantage of influencing the molecular weight of the polymers formed.

U.S. Pat. No. 5,739,222 describes another process, wherein when the internal pressure of the reactor declines, further monomer is fed to the reactor. This procedure will significantly affect the physical properties of the polymer particles.

U.S. Pat. No. 4,015,065 describes a process wherein a polymerization initiator is added at the pressure drop to the polymer formed, while subjecting the polymer to radio frequency dielectric heating. With this process, the aim is to remove or partially remove the abundantly present vinyl halide monomer from the vinyl halide polymer. The use of radio frequency dielectric heating is less desired, since it is energy intensive and affects the properties, such as thermal stability and colour, of the polymer produced.

It is an object of the present invention to provide an improved process which overcomes the disadvantages of the prior art processes. More specifically, it is intended to provide a process wherein the overall polymerization time is reduced by a reduction of the pressure drop time.

The process of the present invention is a process as described in the opening paragraph, and wherein one or more initiators are added to a polymerization mixture at the reaction temperature when the pressure in the polymerization reactor is dropping due to the depletion of the vinyl chloride monomer, with the proviso that the polymer formed is not subject to radio frequency dielectric heating in the presence of additional organic initiator.

During VCM polymerizations, the pressure initially is proportional to the temperature of the reaction mixture. This is because the pressure in the polymerization reactor is predominantly determined by the vapour pressure of the VCM in the polymerization mixture. Towards the end of the polymerization reaction, the VCM is depleted. At a certain moment no liquid VCM phase is present any longer and the pressure in the reactor starts to drop below the pressure otherwise observed at that temperature. After and/or during the pressure drop there still is VCM present in the gas phase, but typically more and more is being adsorbed in the water and polymer phase of the reaction mixture. At that time the polymerization rate conventionally decreases and the cooling capacity of the reactor is not optimally used.

The inventors have now identified these problems and found that the available cooling capacity of the reactor can be used more efficiently if the polymerization rate is enhanced by the addition of one or more initiators after the initial pressure drop and/or during the pressure drop. Preferably, the initiator is added at or after the moment at which the pressure drops in the reactor. It is less preferred to add said initiator before that moment, as it may lead to an undesirable runaway reaction, which is generally accompanied by an undesirable and dangerous increase in pressure. Apart from more efficient use of the cooling capacity, the total polymerization time is reduced due to a higher pressure drop rate, thereby shortening the period in which the pressure of the reactor is dropping. Also, the reactor space-time yield is improved.

By the term "after the start of the pressure drop and/or during the pressure drop" is meant the time during which the pressure in the polymerization reactor drops, including the 30 minutes, preferably 20 minutes, more preferably 10 minutes, and most preferably 5 minutes, before the pressure drop is actually observed. Most preferably, the addition of initiator takes place when the pressure becomes lower than the pressure that was observed earlier at the same temperature.

The initiators can be any kind of organic peroxide suitable for use in the polymerization process, such as peroxydicarbonates and acetyl-cyclohexyl-sulfonyl-peroxide. Hence, the additional initiator can be the same as or different from the initiator(s) used in the polymerization before the pressure drop. More preferred additional initiators are fast initiators such as organic peroxides having a half-life of from 0.0001 to 1 hour at the polymerization temperature. Even more preferred are peroxides having a half-life ranging from 0.0001 to 0.5 hour at the polymerization temperature. Most preferred are extremely fast peroxides having a half-life of from 0.0001 to 0.05 hour at the polymerization temperature.

Preferred examples of organic peroxides used in the process of the invention are 1,1,3,3-tetramethylbutylperoxy methoxy acetate, tert.-butylperoxy methoxy acetate, tert.-amylperoxy methoxy acetate, tert.-butylperoxy ethoxy acetate, diisobutanoyl peroxide (Trigonox® 187), hexanoyl pivaloyl peroxide, 2-ethyl-butanoyl-isononanoyl peroxide, isobutanoyl-lauroyl peroxide, isobutanoyl-isononanoyl peroxide, bis(tert-butylperoxy) oxalate, cyclododecyl-tert. butylperoxy oxalate, 2,2-bis-2-ethylhexanoylperoxy-4-methylpentane, 2,2-bis-2-ethylbutanoylperoxy-4-methylpentane, 2,2-bis(2,2-dimethylpropanoylperoxy)-4-methylpentane, 1-(2-ethylhexanoylperoxy)-1,3-dimethylbutyl-1-peroxypivalate (Trigonox® 267) or 2,4,4-trimethylpentyl-2-peroxyneodecanoate (Trigonox® 423), tert-amyl peroxyneodecanoate (Trigonox® 123), tert-butyl peroxyneodecanoate (Trigonox® 23), benzene (m,p)di(2-isopropyl-2-peroxy-neodecanoate), 2-methyl-4-hydroxypentane-2-peroxyneodecanoate, α-cumyl peroxyneodecanoate (Trigonox® 99), and peroxydicarbonates such as di-sec-butylperoxydicarbonate (Trigonox® SBP), di(4-tert-butylcyclohexyl) peroxy-dicarbonate (Perkadox® 16) and di(2-ethylhexyl) peroxydicarbonate (Trigonox® EHP).

Other organic peroxides having a half-life ranging from 0.0001 to 1 hour at the polymerization temperature can also be used. Whether a peroxide is suitable and has the required half-life can be determined by conventional thermal decomposition studies in monochlorobenzene, as is well-known in the art (see for instance the brochure "Initiators for high polymers" with code 10013921001 available from Akzo Nobel).

The initiator according to the invention can be a redox initiation system. In such a case the reducing agent, the oxidizing agent, or both can be dosed in accordance with the invention. For such redox systems, the half-life of the redox system is the half-life as measured when all components of the system are present. However, in view of the fact that redox systems typically contain heavy metals and/or undesired reducing agents, the initiators of the present invention preferably are not such redox initiation systems.

The amount of initiator (or initiators) to be used in a process according to the invention after the start of the pressure drop and/or during the pressure drop is within the range conventionally used in polymerization processes. Typically, this range has a lower limit of 0.001% by weight (% w/w) of additional initiator and more preferably of 0.005% w/w, and an upper limit of 0.3% w/w of additional initiator, preferably of 0.2% w/w; most preferably, 0.05% w/w, based on the weight of VCM monomer, is used.

The additional initiator is added to the reactor in the pure form or, preferably, in the form of a dilute solution or dispersion (such as a suspension or emulsion). One or more suitable solvents can be used to dilute the initiator. Preferably, such solvents are easily removed during the steps where the polymer is worked up after the polymerization process, such as alcohols, or they are of such a nature that it is acceptable to leave them as a residue in the final polymer, as in the case of solvents that are desired plasticizers for the final resin. Furthermore, it can be advantageous, but is not necessarily required, that such solvents do not adversely affect the thermal stability of the initiator dissolved therein, as can be verified by analyzing the half-life temperature of the initiator in said solvent. An example of such a solvent is isododecane. If an initiator dispersion is added, then the dispersion can be of either the initiator itself or of a solution of the initiator, preferably in said suitable solvents. Preferably, the dispersion is an aqueous dispersion. Preferably, the initiator is added in a concentration of at least 0.1% w/w, more preferably 0.5% w/w, and most preferably 2% w/w, and at most 75% w/w, more preferably at most 60% w/w, even more preferably at most 50% w/w, more preferably still 25% w/w, and most preferably 15% w/w. The more dilute initiator solutions or dispersions ensure rapid mixing of the initiator and the polymerization mixture, which leads to a more efficient use of the initiator, which is important for the fast initiators that are used.

The addition after the start of the pressure drop and/or during the pressure drop preferably is the addition of fast initiators having a half-life of less than 1 hour at the polymerization temperature, as a relatively small residual amount of the initiator will remain in the polymer formed. In order to reduce the residual amount even more, it is preferred to add extremely fast peroxides having a half-life of less than 0.05 hour at the polymerization temperature. However, a slower initiator can also be employed. In that case it can be preferred to add a scavenger which is able to neutralize or destroy the residual initiator in any subsequent step to such an extent that the residual amount of the initiator in the polymer is acceptable. It is also contemplated to add a scavenger when fast and/or extremely fast peroxides are used.

During the first part of the polymerization reaction any conventional initiating system can be used. Herein, the initiator can be added intermittently or continuously to the polymerization mixture at the polymerization temperature. All of the initiator can be added to the reactor at once in just one portion. In such case, preferably a relatively slow initiator having a half-life of more than 1 hour is used. The initiator may also be added at least 2, preferably at least 4, more preferably at least 10, and most preferably at least 20 moments.

Typically, one or more protective colloids are used in the polymerization process of the invention. Examples of suitable protective colloids are protective colloids such as polyvinyl alcohols (PVAs), which may, for example, be (partially) saponified polyvinyl acetates with a degree of hydrolysis of at least 40%, more preferably at least 60%, and most preferably at least 62%, and a degree of hydrolysis of at most 90%, more preferably at most 85%, and most preferably at most 80%. If for example two PVAs are employed, both PVAs may have a similar degree of hydrolysis. It may also be envisaged that the two PVAs have a different degree of hydrolysis. Although said PVAs are the preferred protective colloids for processes according to the invention, it is also possible to use other conventional protective colloids, such as cellulosics, water-soluble polymers, oil-soluble emulsifying agents or water-soluble emulsifying agents. It is also envisaged to employ a combination of two or more of the above protective colloids. The amount and type of colloid that is to be used is well-known and conventional. Optionally, such colloids are also added after the start of the pressure drop and/or during the pressure drop. If used after the start of the pressure drop and/or during the pressure drop, they can be added together with or separately from the initiator which is added in accordance with the invention.

However, in a preferred embodiment, one or more surfactants are added after the start of the pressure drop and/or during the pressure drop. If used in such a fashion, they can be added together with or separately from the initiator which is added in accordance with the invention. The addition of such surfactants was found to be very helpful, since it reduces the (excessive) formation of foam in the process. Examples of suitable surfactants are polyvinyl acetates with a degree of hydrolysis of less than 60% and conventional foam reducers (defoamers), as generally known to a person skilled in the art. Preferably, the surfactant is added together with the additional initiator.

Preferably, the addition of the initiator, of the optional colloid and the optional surfactant, either during the constant pressure time or after and/or during the pressure drop, can be effected at any suitable entry point to the reactor. Such an entry point may be positioned below or above the surface of the reaction mixture, as desired. The addition of these compounds can be separately to the reactor via individual entry points, or they can be pre-mixed and enter the reactor through one entry port, or a combination of such techniques can be used. If water is added in the course of the polymerization process, for example to compensate for the shrinkage of the reactor content due to the polymerization reaction, it can be advantageous to use the line through which this water is added to also add the initiator and/or the optional protective colloid and/or surfactant. It is also envisaged that the reactor comprises dedicated piping and a plurality of entry points located in different positions on the periphery of the said reactor, so as to ensure better, faster, and more homogeneous mixing of the initiator, protective colloid, and/or surfactant in the reaction mixture. If the reactor further comprises a reflux condenser, it is contemplated to add these compounds to the reaction mixture via the reflux condenser.

The process according to the invention is directed to polymerizing monomer mixtures comprising vinyl chloride monomer (VCM). Preferably, the process according to the invention involves the polymerization of monomer mixtures comprising at least 5% w/w of VCM, preferably at least 10% w/w, more preferably at least 20% w/w, and most preferably at least 50% w/w of VCM, based on the weight of all monomer. Comonomers that can be used are of the conventional type and include vinylidene chloride, vinyl acetate, ethylene, propylene, acrylonitrile, styrene, and (meth)acrylates. More preferably, at least 80% w/w of the monomer(s) being polymerized is made up of VCM, while in the most preferred process the monomer consists essentially of VCM. As is known in the art, the polymerization temperature of such processes to a large extent determines the molecular weight of the resulting resin.

The polymerization process can be conducted as a mass process wherein the reaction mixture is predominantly monomer, or as a more preferred suspension process wherein the reaction mixture typically is a suspension of monomer in water, or as an emulsion or micro-emulsion process wherein the monomer typically is emulsified in water. In these processes the usual additives will have to be used. For example, if the monomer is present in the form of a suspension in water, the usual additives like surfactant(s), anti-fouling agent(s), pH-buffer(s), etc. can be present. Depending on the type of polymer desired, each of the above-mentioned processes may be preferred. The process according to the invention is especially suited for use in suspension processes.

After the polymerization, the resulting (co)polymer (or resin) will be worked up as is usual in the art. Polymers obtained by a suspension polymerization according to the invention, for example, will be submitted to the usual drying and screening steps. It is preferred that the resulting resin contains less than 50 ppm of residual initiator, more preferably less than 40 ppm, and most preferably less than 25 ppm of initiator, immediately after drying for 1 hour at 60° C. and screening, since such resins exhibit excellent heat stability as measured with a Metrastat® PSD260 testing oven in accordance with ISO 182-2 (1990E). The improved heat stability proved that the resin hardly discoloured when submitted to melt-processing steps, e.g., to form shaped articles. Hence the process can comprise an additional process step in which excess initiator is decomposed. Preferably, said process step is taken after the polymerization reaction has finished and before the resin has dried.

Examples to demonstrate the unexpected effect of the addition of fast peroxides during the pressure drop in PVC suspension polymerization:

EXPERIMENTAL

In a standard suspension polymerization experiment, a temperature controlled 1-liter stainless steel Büchi reactor provided with one baffle, a three-bladed stirrer, a pressure transducer, a VCM feed line, and a nitrogen purge line was charged with 425 g demineralized water, Alcotex B72 (1000 ppm on VCM) in a 5% w/w solution in demineralized water, and was pressurized to 15 barg, using nitrogen. If no leaks are observed, the reactor is evacuated and pressurized with nitrogen up to 5 barg three times to flush out virtually all air. Next, the reactor was evacuated and charged with 250 g VCM ex Akzo Nobel Salt & Basics, followed by heating up of the reactor to the polymerization temperature in 30-60 min. The conventional peroxide, such as Trigonox® EHP (Tx EHP), used to initiate the polymerization is added via a hot-start procedure. The hot-start procedure means that the peroxide is added to the reactor at the polymerization temperature in a very short period, i.e. 1-5 min.

During the pressure drop period of the polymerization a fast initiator with a half-life at the polymerization temperature of less than 0.1 hr. is added to the reactor until the pressure in the reactor has dropped 3.5 bar. For adding of the (additional) fast initiator, a relatively low-concentration (about 1% w/w) emulsion is used. In the comparative example the addition of the (additional) fast initiator was omitted.

After reaching the said pressure drop of 3.5 bar the peroxide dosing was stopped and then the reactor was cooled to 20-25° C., evacuated, and freed of virtually all remaining VCM. The polymer was obtained after filtration, washing, and drying (at 60° C. for 1 hour using a fluidized bed).

Example 1

The initiators used (Tx EHP (75% w/w) dissolved in isododecane (25% w/w) and Tx 187 [0.3% w/w aqueous emulsion]), the amount dosed, the dosing procedure, and the polymerization results are presented in Table 1.

After reaching the polymerization temperature the mentioned amount of Tx EHP (calculated on VCM) in isododecane is added in a period of 1-5 minutes.

TABLE 1

The results of VCM suspension polymerization with di(2-ethylhexyl) peroxydicarbonate (Tx EHP) at 57° C. without (Comparison example) and with (Example 1) adding of diisobutanoyl peroxide (Tx 187) during the pressure drop

| | Example 1 | Comparison example |
|---|---|---|
| Hot-start peroxide and quantity | 800 ppm Tx EHP | 800 ppm Tx EHP |
| Adding peroxide during pressure drop | 80 ppm Tx 187 during 30 minutes | None |
| Constant pressure time | 182 min | 180 min |
| Pressure drop rate | 7 bar/hr | 4 bar/hr |
| Polymerization time until the reactor pressure has dropped 3.5 barg | 210 minutes | 230 minutes |
| PVC yield | 91% | 87% |

From Table 1 it is deduced that the process of Example 1 clearly has a significantly higher pressure drop rate compared to the conventional process of the comparison example. This higher drop rate leads to a shorter polymerization time. The higher pressure drop rate clearly makes for better usage of the cooling capacity of the reactor.

The invention claimed is:
1. Process wherein two or more initiators are used to polymerize a mixture containing one or more monomers of which one is vinyl chloride monomer,
    wherein the one or more monomers are polymerized at a polymerization temperature using an initiator with a half-life of more than 1 hour at the polymerization temperature,
    and one or more additional initiators are added to the polymerization mixture at the same polymerization temperature when the pressure in the polymerization reactor is dropping due to the depletion of gas phase vinyl chloride monomer,
    and said additional initiators have a half-life of less than 1 hour at polymerization temperature,
    wherein addition of said one or more additional initiator is not before the pressure has become less than the pressure that was observed earlier at the same polymerization temperature, with the proviso that the polymer formed is not subject to radio frequency dielectric heating in the presence of additional organic initiator.

2. A process according to claim 1 wherein the initiator added after the start of the pressure drop and/or during the pressure drop has a half-life of from 0.0001 hour to 1 hour at the polymerization temperature.

3. A process according to claim 2 wherein the additional organic initiator added after and/or during the pressure drop has a half-life of from 0.0001 hour to 0.05 hour at the polymerization temperature.

4. A process according to claim 1 wherein at least part of the initiators is added intermittently and/or continuously after the start of the pressure drop and/or during the pressure drop.

5. A process according to claim 1 wherein a surfactant is also added when the pressure in the polymerization reactor is dropping due to the depletion of the vinyl chloride monomer to reduce the formation of foam.

6. A process according to claim 2 wherein at least part of the initiators is added intermittently and/or continuously after the start of the pressure drop and/or during the pressure drop.

7. A process according to claim 3 wherein at least part of the initiators is added intermittently and/or continuously after the start of the pressure drop and/or during the pressure drop.

8. A process according to claim 2 wherein a surfactant is also added when the pressure in the polymerization reactor is dropping due to the depletion of the vinyl chloride monomer to reduce the formation of foam.

9. A process according to claim 3 wherein a surfactant is also added when the pressure in the polymerization reactor is dropping due to the depletion of the vinyl chloride monomer to reduce the formation of foam.

10. A process according to claim 4 wherein a surfactant is also added when the pressure in the polymerization reactor is dropping due to the depletion of the vinyl chloride monomer to reduce the formation of foam.

11. A process according to claim 1 wherein at least one initiator of said conventional initiating system is different from at least one initiator of said one or more additional initiators.

12. A process according to claim 1 wherein a half-life of said conventional initiating system is different from a half-life of said one or more additional initiators.

13. A process according to claim 1 wherein a half-life of said conventional initiating system is longer than a half-life of said one or more additional initiators.

14. A process according to claim 1 wherein a half-life of said conventional initiating system is more than one hour and a half-life of said one or more additional initiators is less than one hour.

15. A process according to claim 1 wherein a half-life of said conventional initiating system is more than one hour and a half-life of said one or more additional initiators is less than 0.05 hour.

16. A process according to claim 1, wherein the polymerization temperature is at a pre-set temperature.

17. A process according to claim 1, wherein the polymerization mixture in the first part of the polymerization reaction is a constant pressure and polymerization temperature.

18. A process according to claim 1, wherein the pressure drop is observed towards the end of the polymerization process.

* * * * *